No. 688,370. Patented Dec. 10, 1901.
H. P. WELLS.
THILL COUPLING.
(Application filed Oct. 14, 1901.)
(No Model.)
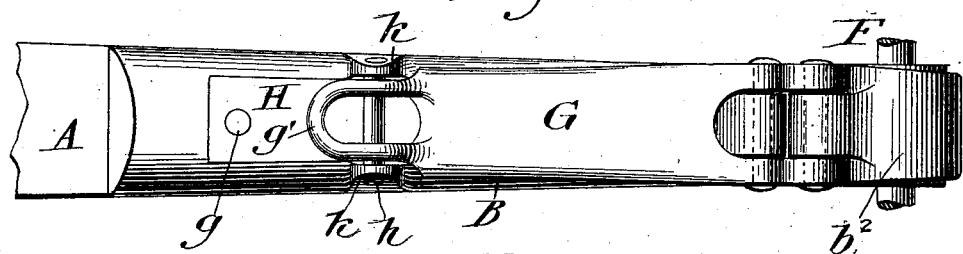
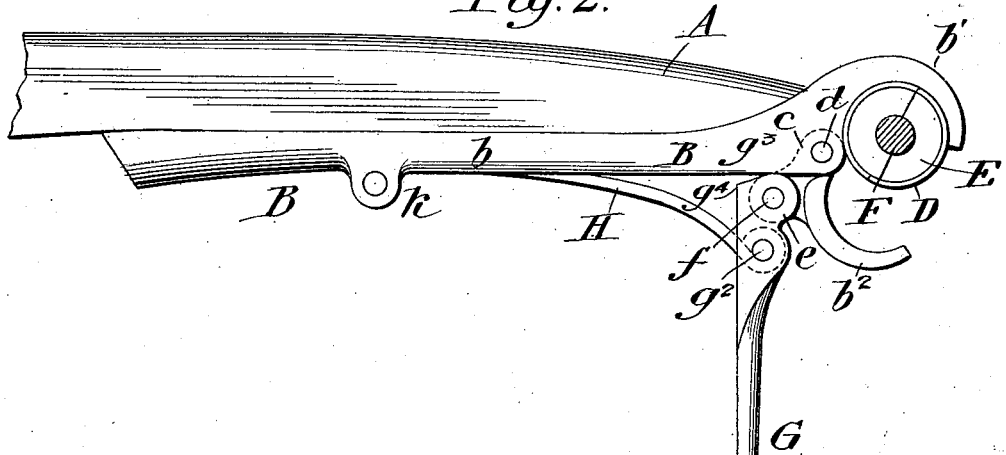
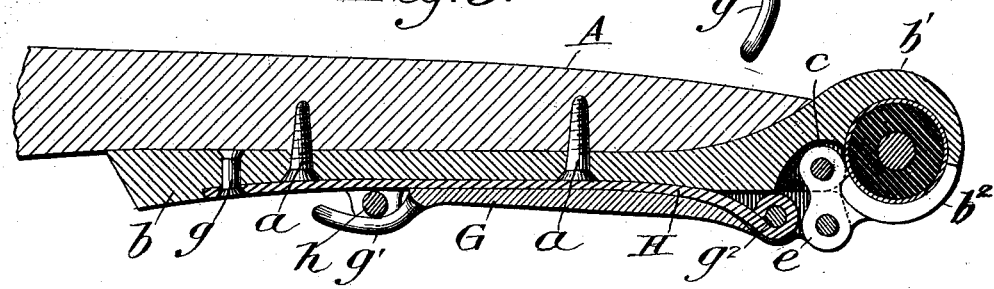
Witnesses:
D. W. Edelin.
B. Olive.
Inventor:
Harlan P. Wells,
By J. J. Stebbins, Atty.

UNITED STATES PATENT OFFICE.

HARLAN P. WELLS, OF AMESBURY, MASSACHUSETTS.

THILL-COUPLING.

SPECIFICATION forming part of Letters Patent No. 688,370, dated December 10, 1901.

Application filed October 14, 1901. Serial No. 78,623. (No model.)

*To all whom it may concern:*

Be it known that I, HARLAN P. WELLS, a subject of the King of Great Britain and Ireland, residing at Amesbury, in the county of Essex and State of Massachusetts, have invented new and useful Improvements in Thill-Couplings, of which the following is a specification.

The invention relates to improvements in thill-couplings, and has for its object the production of a device which can readily be attached to and detached from the spool or bolt upon the axle of a vehicle.

With this end in view my invention consists of a spring-clamping mechanism formed and constructed as hereinafter described and claimed.

The accompanying drawings, which form a part of this specification, show one example of the physical embodiment of the improvement constructed according to the best mode I have so far devised for the application of the principle.

Figure 1 represents a bottom plan view of an end portion of a thill or shaft with my coupling attached. Fig. 2 represents a side view of the parts shown in Fig. 1, the coupling being open. Fig. 3 represents a central longitudinal sectional view of the same.

Similar letters indicate like parts in the different figures.

A designates a shaft or thill, to the end and under side of which is secured the coupling B by means of the screws or bolts $a$ $a$.

The coupling B, which is of metal, is composed of a main body portion $b$, having on its end a curved extension forming the fixed jaw $b'$. A movable jaw $b^2$ is pivoted to the main body $b$ by means of a tongue or projection $c$, which is mounted on a stud $d$, secured in bearings on the said body. These jaws $b'$ and $b^2$ form a clamp adapted to embrace the split metallic ring D and the split expansile sleeve or washer E, of rubber or other material, which clasp the bolt or spool F of the axle of a vehicle. As a spool on an axle of a vehicle is not new, and as the same is not claimed *per se*, no further description and illustration of the same are deemed necessary. The said jaw $b^2$ is also provided adjacent the tongue $c$ with another tongue or projection $e$, which is pivoted on a stud $f$, having bearings in the end of a lever-arm G, normally adapted to rest flat against the body $b$ by the pressure of the strong leaf-spring H. The said spring H is secured in a recess in said body, to which latter it is fastened at one end by the rivet $g$ and intermediate of its ends by the transversely-located pin $h$, the latter being secured in the projections $k$ on the sides of said body $b$, so as also to permit the curve end $g'$ of the lever-arm G to project away from the said body, thereby allowing the said arm to be readily grasped, so as to be conveniently operated. The other end of the spring H is pivotally secured by means of the stud $g^2$ to the lever-arm G near the end of the latter, which is pivoted to the jaw $b^2$. When the lever-arm G is depressed or in the position shown in Figs. 1 and 3, the force or tension of the spring is exerted to hold the said arm flat against the body $b$, and thereby raise the tongue $e$, with stud $f$, away from the said body, so that the jaw $b^2$ is forced into close proximity or contact with the jaw $b'$, thus firmly clasping the split ring D and rubber sleeve E, and thereby securely binding the coupling to the bolt or spool F of the axle.

When it is desired to detach the shaft or thill from the axle, the lever-arm G is grasped at its end $g'$ and raised against the tension of the spring. As the lever-arm is raised from the body $b$ on its heel $g^4$, the end of the spring H, which is secured to said arm, is drawn away from the said body, and the arm turns or oscillates on the end of said spring as a fulcrum, drawing the tongue $e$ toward the body, thereby partially rotating the tongue $c$ on its stud $d$ and causing the jaw $b^2$ to separate from the jaw $b'$. As the lever-arm is further raised until the heel $g^4$, which moves along the body, passes a line at right angles from the said body to the stud $g^2$, the tension of the spring is then exerted, so as to hold the arm with its end $g^3$ against the body, further movement of the arm in this direction being prevented by the tongue $e$ abutting against the body $b$, thereby limiting the opening of the jaw $b^2$.

Owing to the tension of the spring H the coupling is reliably kept in closed position and is not opened except by the operation of the arm G, which latter, owing to its small size and guarded position, its outer surface being flush with that of the body $b$, is not readily contacted with by accidental interfering objects. When, however, it is desired to uncouple the thill from the bolt or spool, the lever-arm may be raised by hand, and when raised the proper distance, as shown in Fig. 2, the force of the spring will hold the coupling open while the uncoupling is effected and until the end $g'$ of the arm is depressed or moved toward the body $b$, so that the heel $g^4$ is on the opposite side of a vertical line from the stud $g^2$ to the said body, when it (the spring) will aid in depressing or closing the arm on the body. The spring operates against the arm in the initial portion of each of the movements of the latter and with it at the close of each movement, thus aiding in retaining the arm in place either against the body, as in Figs. 1 and 3, or at right angles thereto, as in Fig. 2. No tool is necessary in the operation of either coupling or uncoupling the shaft or thill and the axle, the device being complete in itself.

It will readily be seen that the coupling herein described is simple in character and efficient in operation, of few parts, not readily liable to damage, and easy to be repaired. Moreover, it has no projecting parts and presents a very neat appearance.

Having thus described my invention, what I claim, and desire to secure by Letters Patent, is—

1. A thill-coupling, consisting of a main body portion with a fixed jaw at one end; a movable jaw pivoted to said main body; a lever-arm pivotally connected at one end to said pivoted jaw; and a spring connected with said arm intermediate of its ends, and also with said main body; said parts being combined substantially as described.

2. A thill-coupling, consisting of a main body portion having at one end a curved extension forming a fixed jaw, and provided with a pivoted jaw adapted to close on said fixed jaw; a lever-arm pivotally connected at one end to said pivoted jaw; and a spring seated in a recess in said body and secured at one end thereto and at its other end to said lever-arm intermediate of its ends; said spring holding said arm in fixed position either when fully depressed or fully raised; substantially as described.

3. A thill-coupling, consisting of a main body adapted to be secured to a shaft or thill and having a fixed jaw and provided with a pivoted jaw, a lever-arm pivotally connected with said pivoted jaw so as to open or close the same, and a spring connected with said body and pivotally with said arm; said parts being combined substantially as described.

4. A thill-coupling, consisting of a body with a fixed jaw and provided with a pivoted jaw, a lever-arm connected with said pivoted jaw and adapted to either open or close the same, and a spring directly connected with said body and arm, so as to act against the latter in the initial portion of its movement in either direction and with it in the closing portion of the movement; substantially as described.

5. A thill-coupling, consisting of a body with a fixed jaw at one end and provided with a pivoted movable jaw, a lever-arm pivotally attached at one end to a tongue on said movable jaw, and a leaf-spring seated in a recess in said body and secured at one end thereto and at its other end to said lever-arm, said spring being adapted to hold said arm in place in either a depressed or a raised position; substantially as described.

6. A thill-coupling, consisting of a body with a fixed jaw and provided with a pivoted jaw; a lever-arm pivotally connected with said pivoted jaw; and a leaf-spring secured at one end to said body by a transverse pin having bearings in projections on said body; said arm having a curved end adapted to close on said pin away from said body; said parts being combined substantially as described.

7. The combination with a shaft, of a coupling comprising a body portion, $b$, having a jaw, $b'$; a movable jaw pivoted to the body portion; a spring, H, secured to the body portion; and a lever-arm pivoted to the spring and to the movable jaw; in substance as set forth.

In testimony whereof I affix my signature in presence of two witnesses.

HARLAN P. WELLS.

Witnesses:
GEORGE N. BRIGGS,
DELL W. DOLBIER.